US009210556B2

(12) United States Patent
Neely et al.

(10) Patent No.: US 9,210,556 B2
(45) Date of Patent: *Dec. 8, 2015

(54) UNIVERSAL MOBILE DEVICE MESSAGING

(71) Applicant: Microsoft Corporation, Redmond, WA (US)

(72) Inventors: Samuel J. Neely, Sammamish, WA (US); John Allen Atwood, Duvall, WA (US); Harvinder S. Bhela, Bellevue, WA (US); Selvaraj Nalliah, Redmond, WA (US); David P. Limont, Seattle, WA (US); Katy Chen, Kirkland, WA (US); Omar Aftab, Kirkland, WA (US); Juan Vicente Esteve Balducci, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,257

(22) Filed: Nov. 7, 2013

(65) Prior Publication Data

US 2014/0066109 A1    Mar. 6, 2014

Related U.S. Application Data

(63) Continuation of application No. 12/250,470, filed on Oct. 13, 2008, now Pat. No. 8,649,808.

(51) Int. Cl.
*H04W 4/00* (2009.01)
*H04W 4/12* (2009.01)
*H04L 12/58* (2006.01)

(52) U.S. Cl.
CPC .............. *H04W 4/12* (2013.01); *H04L 12/589* (2013.01); *H04L 12/5895* (2013.01); *H04L 51/36* (2013.01); *H04L 51/38* (2013.01)

(58) Field of Classification Search
None
See application file for complete search history.

(56) References Cited

U.S. PATENT DOCUMENTS

| 7,027,808 B2 | 4/2006 | Wesby |
| 2002/0112014 A1 | 8/2002 | Bennett et al. |

(Continued)

OTHER PUBLICATIONS

Outlook SMS: Send and Receive SMS with Microsoft Outlook SMS, [online], [retrieved on Jul. 1, 2008], pp. 1-2. Retrieved from http://www.esendex.com/en/UK/Services/Outlook-SMS/.

(Continued)

*Primary Examiner* — Suhail Khan
(74) *Attorney, Agent, or Firm* — Louise Bowman; Danielle Johnston-Holmes; Micky Minhas

(57) ABSTRACT

A unified messaging system allows the receipt and sending of different messages across devices is established by creating relationships that leverage the capabilities of different devices. A message server establishes a relationship with a mobile device. Through the relationship, the message server can use the mobile device to send different types of messages that the server computer cannot transmit. A relationship between a client and a server extends this capability to the client. Through these relationships, a client can retrieve mobile device messages as well as generate them. The generated mobile device messages are transmitted to the message server. The message server determines that the received messages are mobile device messages that the server cannot deliver and sends the mobile device messages to the user's mobile device. The mobile device receives the mobile device messages from the message server and transmits the mobile device message to recipient mobile devices.

20 Claims, 7 Drawing Sheets

(56) References Cited

U.S. PATENT DOCUMENTS

| | | |
|---|---|---|
| 2002/0143995 A1 | 10/2002 | Yeh |
| 2003/0119532 A1 | 6/2003 | Hatch |
| 2004/0082348 A1 | 4/2004 | Gabriel et al. |
| 2004/0199663 A1 | 10/2004 | Horvitz et al. |
| 2004/0203843 A1 | 10/2004 | Najafi |
| 2005/0096094 A1 | 5/2005 | Kim et al. |
| 2006/0111131 A1* | 5/2006 | Shin et al. .................. 455/466 |
| 2006/0218234 A1 | 9/2006 | Deng et al. |
| 2007/0097996 A1 | 5/2007 | Millefiorini et al. |
| 2007/0143435 A1 | 6/2007 | Daigle et al. |
| 2007/0249375 A1 | 10/2007 | Zapata et al. |
| 2007/0280445 A1 | 12/2007 | Shkedi |
| 2008/0176587 A1 | 7/2008 | Glazer et al. |
| 2010/0093379 A1 | 4/2010 | Neely et al. |

OTHER PUBLICATIONS

'2 Way' SMS text messaging. Send & Receive Text Messages from your Office Computes, [online], [retrieved on Jul. 1, 2008], pp. 1-2. Retrieved from http://www.text-connect.co.uk/.

Mobifi SMS Messaging Solutions, [online], [retrieved on Jul. 1, 2008], pp. 1-2. Retrieved from http://www.mobifi.com/product-email-sms.php.

Hosted Software: BT Business Email, [online], [retrieved on Jul. 1, 2008], pp. 1-2. Retrieved from http://www.productsandservices.bt.com/btbusinessProducts/displayCategory.do?categoryId=BTB-HOSTED-SOFTWARE-I.

Exchange Server 2007 Support for Mobile Devises, [online], Mar. 27, 2007, [retrieved on Jul. 1, 2008], pp. 1-3. Retrieved from http://www.microsoft.com/exchange/evaluation/features/owa_mobile.mspx.

U.S. Appl. No. 12/250,470, Office Action mailed Feb. 14, 2011, 19 pgs.

U.S. Appl. No. 12/250,470, Amendment and Response filed Jul. 14, 2011, 15 pgs.

U.S. Appl. No. 12/250,470, Office Action mailed Sep. 21, 2011, 21 pgs.

U.S. Appl. No. 12/250,470, Amendment and Response filed Dec. 21, 2011, 17 pgs.

U.S. Appl. No. 12/250,470, Office Action mailed Apr. 25, 2012, 22 pgs.

U.S. Appl. No. 12/250,470, Amendment and Response filed Jul. 25, 2012, 11 pgs.

U.S. Appl. No. 12/250,470, Office Action mailed Sep. 6, 2012, 20 pgs.

U.S. Appl. No. 12/250,470, Amendment and Response filed Jan. 7, 2013, 15 pgs.

U.S. Appl. No. 12/250,470, Office Action mailed Mar. 1, 2013, 23 pgs.

U.S. Appl. No. 12/250,470, Amendment and Response filed Jul. 1, 2013, 16 pgs.

U.S. Appl. No. 12/250,470, Notice of Allowance mailed Jul. 19, 2013, 8 pgs.

U.S. Appl. No. 12/250,470, Amendment and Response filed Oct. 14, 2013, 3 pgs.

* cited by examiner

UNIVERSAL MOBILE DEVICE MESSAGING

CROSS-REFERENCE TO RELATED APPLICATIONS

This application is a continuation of and claims benefit to U.S. Pat. No. 8,649,808, filed Oct. 13, 2008, which application is hereby incorporated herein by reference.

BACKGROUND

As electronic devices become more prevalent and network connection speeds increase, more and more users incorporate the use of their mobile (e.g., handheld) devices with their corporate enterprise products. This provides users with the ability to access email messages, calendar appointments, and tasks managed by their corporate enterprise products on their mobile devices.

However, due to differences in network requirements user's mobile devices are able to send types of messages that are not generally supported by corporate enterprise products. Thus, users do not have the ability to ubiquitously access their mobile device messages from both their mobile device and their corporate enterprise products.

It is with respect to these and other considerations that embodiments of the present invention have been made. Also, although relatively specific problems have been discussed, it should be understood that embodiments of the present invention should not be limited to solving the specific problems identified in the background.

SUMMARY

Embodiments of the present disclosure relate to integrating a user's ability to access and send mobile device messages from devices other than their mobile device. In one embodiment, a relationship is established between a mobile device and a message server. A client accessing the message server is able to leverage the relationship between the mobile device and the message server to send mobile device messages from the client. In such embodiments, the client generates a mobile device message and sends the message to the message server. The message server then forwards the mobile device message to the user's mobile device. The user's mobile device may then be used to send the mobile device message to a recipient mobile device.

In further embodiments, the relationship established between the mobile device and the message server provides for synchronization of the mobile device messages among the client, the message server, and the mobile device. Additional embodiments leverage the relationship between the message server and the mobile device to provide additional functionality between the mobile device and the client. In one embodiment, the client may receive information regarding the mobile device's health which it then displays to a user accessing the client. In another embodiment, the client controls the mobile device by issuing device instructions to the message server, which relays the instructions to the mobile device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Embodiments of the present disclosure may be more readily described by reference to the accompanying drawings in which like numbers refer to like items and in which.

DETAILED DESCRIPTION

Figure 1:
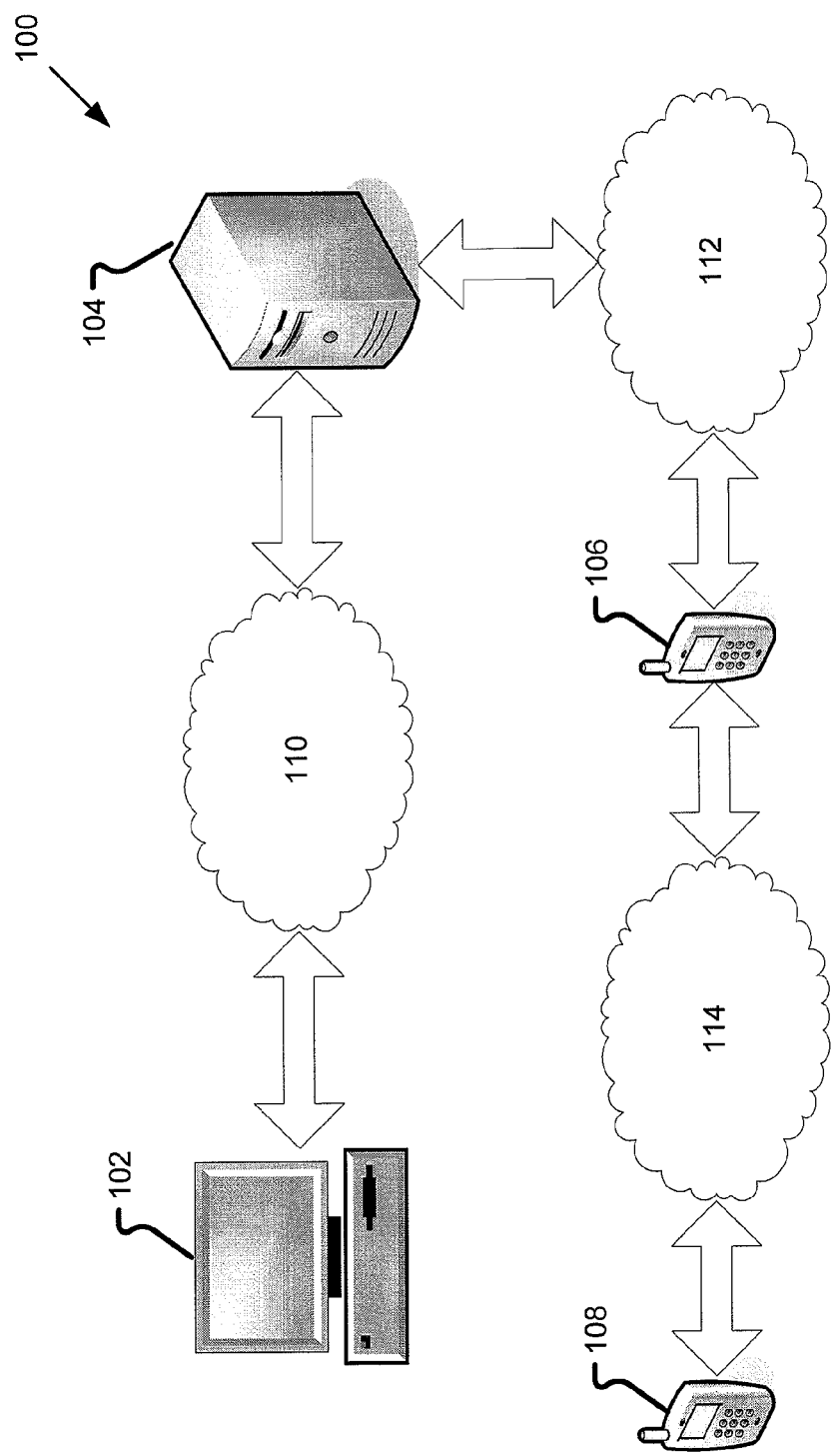
FIG. 1 illustrates an embodiment of a system 100 for transmitting mobile device messages between a client and a mobile device.

This disclosure will now more fully describe exemplary embodiments with reference to the accompanying drawings, in which some of the possible embodiments are shown. Other aspects, however, may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

In embodiments, a mobile device message is a type of message generally transmitted between mobile devices. As used herein, a mobile device may be a cell phone, a smart phone, or any other device capable of transmitting mobile device messages over mobile device networks. In embodiments, a mobile device message may be a short message service ("SMS") message, an Enhanced Messaging Service (EMS) message, a multimedia messaging service ("MMS"), or any other mobile device message as known to those with skill in the art. Generally, mobile device messages are transmitted between mobile devices via the mobile device network operated by a mobile device carrier, such as a cell phone network. In other embodiments, mobile device messages may be transmitted over other networks such as the Internet or a standard Plain Old Telephone Service ("POTS") network. However, because most mobile device messages are transmitted between mobile devices on a mobile device network, users who desire to transmit mobile device messages must establish a relationship with mobile device networks. Because of this, many barriers exist that users must overcome to send mobile device messages from devices other than a standard mobile device. For example, a user wishing to send a SMS message from a client computer to a mobile device must establish a relationship with the mobile device's respective network or a service aggregator company (e.g., a company that has contracts with multiple mobile operators). Establishing a relationship may require the user to establish a billing relationship with the operator of the mobile device network and establish an identity which may be used to operate in the mobile device network. Generally, this requires contractual agreements between the user and the mobile device network. The establishment of such a relationship is required for a user to access the mobile device network in order to send mobile device messages over the mobile device network. Furthermore, many mobile devices operate within different networks owned and operated by different carriers. Thus, to communicate with different mobile devices on different mobile networks from a single client computer, the user would be required to enter into a separate relationship with each mobile network or a number of different aggregate service providers. This is a burdensome task for the user to undertake. Furthermore, even if the user establishes such relationships and is capable of sending mobile device messages from other devices, the user will not necessarily be able to receive mobile device messages from all of the mobile networks.

Mobile device users generally established such relationships with multiple mobile networks when purchasing the mobile device and subscribing to a mobile network service. Furthermore, carriers of different mobile device networks generally have pre-established agreements that allow access among the various, different mobile device networks. This allows a user of a mobile device on one network to transmit messages to mobile devices operated on other networks. Thus, a user desiring to send mobile device messages from other devices, such as a client computer, can leverage the user's subscription to a mobile network service to send mobile device messages to other mobile devices without having to enter into a relationships with other mobile device networks.

FIG. 1 illustrates an embodiment of a system 100 for transmitting mobile device messages between a client and a mobile device. In embodiments, a user of client computer 102 may desire to send a mobile device message, such as an SMS or MMS message, to mobile device 108. While embodiments of FIG. 1 are described with respect to client computer 102, one of skill in the art will appreciate that the disclosed embodiments may be practiced on any device capable of sending messages. The user of client computer 102 may own mobile device 106. As previously explained, if the user wishes to send a mobile device message from client computer 102 to mobile device 108 it is required to establish a relationship with the mobile device network that services mobile device 108. However, because the user of client computer 102 also operates user's mobile device 106, the user can leverage the pre-existing relationship between mobile device 106 and other mobile device networks. By doing so, the user will be able to send mobile device messages from client computer 102 to mobile device 108 via the user's mobile device 106.

In embodiments, an application on client computer 102 is capable of accessing messages sent to the user. The messages may be stored locally or remotely. Client computer 102 may execute a personal information application which allows the user to access messages such as email. One non-limiting example of a personal information application may be MICROSOFT OUTLOOK®; however one of skill in the art will appreciate that the embodiments disclosed herein may operate on any type of personal information application. In further embodiments, the user of client computer 102 may access messages via a browser by accessing an online message repository. Non-limiting examples of online message repositories include, but are not limited to, web-based email such as MICROSOFT OUTLOOK® Web Access, Post Office Protocol ("POP") compliant repositories, Internet Message Access Protocol ("IMAP") compliant repositories, or any other type of online message repository know in the art. In embodiments, whether the messages are accessed via a personal information application or remotely via a browser, the messages are stored remotely in a message server such as message server 104. The message server may be a MICROSOFT® Exchange Server or any other type of message server known in the art. Client computer accesses the messages stored on message server 104 via network 110. In embodiments, network 110 may be any type of network capable of transmitting data such as a wide area network ("WAN") a local area network ("LAN"), the Internet, or any other type of data network known in the art. In one embodiment, when the user accesses messages via a personal information application, the messages are transmitted from message server 104 to client computer 102 and displayed via the personal information application. One of skill in the art will readily appreciate that the embodiments described herein will operate similarly regardless of the type of message repository (e.g., whether the messages are accessed via a personal information manager or accessed remotely via a browser). However, for ease of explanation, an embodiment will now be described with respect to accessing a message repository using a personal information manager.

In embodiments, the personal information application allows the user to read the messages and perform message functions (e.g., reply to the message, forward the message, organize the message, create new messages, etc.) In embodiments, the user is able to send messages from client computer 102 via message server 104. In such embodiments, the message is sent from client computer 102 to message server 104 via network 110. Message server 104 then transmits the message to its intended destination. For example, if the user desires to send an email message, the email message is generated at client computer 102 and sent to message server 104. Message server 104 then transmits the email message to a recipient account located on another message server (not shown). While message server 104 is generally configured to transmit messages to other messages servers via the Internet or other network, message server 104 cannot transmit mobile device messages to mobile devices due to the issues previously discussed with respect to sending mobile device messages from non-mobile devices.

In embodiments, the user may establish a relationship between the message server 104 and the user's mobile device 106. In embodiments, the relationship may be a MICROSOFT® Exchange ACTIVESYNC® relationship that allows the mobile device to access corporate information, such as but not limited to, email messages, calendar information and task information, stored on message server 104. In embodiments, the relationship between the message server 104 and the user's mobile device 106 may be established in a one-click fashion. That is, the relationship may be established by providing the user's mobile device 106 with information, such as message server location, the user's email address, the user's password, etc., that allow the user's mobile device to access the user's account on message server 104. The relationship does not require the user to input credit card information, enter licensing agreements, or third party contract as may be required for the user to access a mobile device network.

In embodiments, the relationship between the message server and the user's mobile device can be set up through a sequence of messages passed between the message server and the user's mobile device. For example, XML messages may be passed between the message server and the user's mobile device to establish a relationship in which the user's mobile device transmits and receives mobile device messages for the message server. Table 1 provides an embodiment of a XML message for establishing a relationship between a message server and a user's mobile device.

TABLE 1

Embodiment of a XML Message Used to Establish a Relationship.

```
<?xml version="1.0" encoding="utf-8"?>
<Settings xmlns="Settings:">
    <DeviceInformation>
        <Set>
            <Model>Manufacturer-Name-Number</Model>
            <IMEI>123456789012345</IMEI>
            <FriendlyName>My PPC Phone</FriendlyName>
            <OS>PPC</OS>
            <Language>us-EN</Language>
            <PhoneNumber>206-555-1212</PhoneNumber>
            <EnableOutboundSMS>1</EnableOutboundSMS>
            <MobileOperator>T-Mojo</MobileOperator>
        </Set>
    </DeviceInformation>
</Settings>
```

Although the embodiment disclosed in Table 1 illustrates the use of XML messages to establish the relationship between the message server and the user's mobile device, one of skill in the art will appreciate that any other type of message format and/or language may be employed with disclosed embodiments.

Once the relationship is established between the message server and the user's mobile device, the user can access messages and other corporate information from the user's device as well as from a personal information application residing on client 102. The user's mobile device 106 is capable of accessing the message server via network 112. In embodiments, network 112 can be, but is not limited to, a WAN, a LAN, the Internet, a mobile device network, or a combination of the above. This allows the user to send email messages from the user's mobile device 106 via message server 104.

In embodiments, upon establishing the relationship between the message server 104 and the user's mobile device 106, the user will be able to send mobile device messages from the client computer 102 to other mobile devices, such as mobile device 108. In embodiments, a mobile device message is generated at client computer 102 and sent to message server 104 via network 110. Message server 104 determines that the message received from the client computer 102 is a mobile device message. The act of determining by the message server 104 that the message is a mobile device message is described further with respect to FIG. 3. Generally the message server 104 is responsible for delivering messages from the client. However, as previously described, message server 104 is unable to deliver mobile device messages. Thus, upon determining that the message received by the client is a mobile device message, message server 104 pushes the mobile device message to user's mobile device 106. In such embodiments, user's mobile device 106 delivers the message to the recipient mobile device (e.g., mobile device 108). In embodiments, the mobile device message is delivered to mobile device 108 via network 114. In embodiments, network 114 may be the mobile device network operated by the user's mobile device carrier. In another embodiment, network 114 may be a network operated by a mobile device carrier other than the user's mobile device carrier. In further embodiments, network 114 may be a combination of mobile device networks, a POTS network, a WAN, a LAN, the Internet, or any other type of network known to the art. Delivery of the mobile device message by the user's mobile device 106 is described further with respect to FIG. 5.

Thus, in embodiments, the user's mobile device 106, not the message server 104, delivers the mobile device message. Because the user's mobile device 106 delivers the mobile device message, client computer 102 and message server 104 can leverage the pre-existing arrangements (e.g., contracts, billing agreements, access capabilities, etc.) set up by the user's mobile device carrier. By transferring the responsibilities of delivering mobile device messages from the message server 104 to the user's mobile device 106, the user can send mobile device messages from client computer 102 to other mobile devices, such as mobile device 108.

The embodiments described in FIG. 1 also allow a user to receive and access mobile device messages from client computer 102. In such embodiments, the user's mobile device 106 receives a mobile device message from another mobile device, such as mobile device 108 or any other device (not shown). Upon receiving the mobile device message, the user's mobile device sends the mobile device message to message server 104. The embodiments of receiving a mobile device message at the user's mobile device and sending the mobile device message to the message server is further described with respect to FIG. 6. The user's mobile device 106 is capable of sending the mobile device message to message server 104 because of the relationship previously established between the user's mobile device 106 and the message server 104.

Upon receiving the mobile device message at message server 104 from user's mobile device, in embodiments, the message server 104 determines that the message is a mobile device message and processes the message accordingly. Message server 104 then sends the mobile device message to client computer 102. Embodiments of the message server 104 configured to receive, process, and send the mobile device messages to the client computer are further described with respect to FIG. 4.

Upon receiving the mobile device message at client computer 102 from message server 104, in embodiments the client computer 102 determines that the message is a mobile device message and processes the message accordingly. In further embodiments, the client computer 102 displays the mobile device message to the user. In yet another embodiment, the client computer 102 allows the user to operate upon the mobile device message. In such embodiments, user operations may include, but are not limited to, forwarding the mobile device message, replying to the mobile device message, searching the mobile device message, moving the mobile device message, transcoding the message information, or any other type of message operations known to the art. Embodiments of receiving and processing the mobile device message by the client computer 102 are further described with respect to FIG. 2.

In further embodiments, the relationship established between the message server 104 and user's mobile device 106 allows for the synchronization of mobile device messages among the client computer 102, the message server 104, and the user's mobile device 106. In such embodiments, changes to the mobile device messages by one of the devices are reflected across all devices. For example, if the user deletes a mobile device message from client computer 102, the mobile device message is also deleted from message server 104 and the user's mobile device 106. Similarly, in embodiments any type of creation or sorting of the mobile device messages on client computer 102 will be reflected in one or both message server 104 and user's mobile device 108. While synchronization between the devices is described with respect to creating, deleting, and sorting the mobile device messages, one of skill in the art will appreciate that any type of message operation may be synchronized between the devices. Furthermore, while synchronization is described with respect to changes occurring on client computer 102, one of skill in the art will readily appreciate that actions originating from message server 104 and the user's mobile device 102 will similarly be synchronized between the devices.

In such embodiments, the message server 104 may handle synchronization of mobile device messages between the client computer 102 and the user's mobile device 106 differently from handling email messages. For example, message server 104 may only forward the mobile device message to client computer 102 when the mobile device message contains a number in the "TO" field that matches the phone number associated with the user of client computer 104. Additionally, in embodiments the message server 104 will only forward the mobile device message sent from the client computer 102 to a user's mobile device 104 when the phone number of the user's mobile device matches the number in the "FROM" field of the mobile device message.

In yet another embodiment, the relationship established between the message server 104 and user's mobile device 106 may allow additional functionality to be performed on the mobile device message that may not be supported by a mobile device. For example, the data type and or data structure of the mobile device message may be changed into a format not supported by the mobile device (e.g., XML, HTML, etc.) Additional operations may also be performed on the mobile device message, such as truncating the message, concatenating mobile device messages, organizing the mobile device messages in a conversation thread, storing the mobile device message in a folder, etc. The described operations are provided as examples of additional functionality and are not intended to limit the scope of additional functionality that may be performed on mobile device messages as a result of the relationship between message server 104 and the user's mobile device 106. One of skill in the art will recognize that any type of operation performed on messages may be practiced with the disclosed embodiments.

In still further embodiments, the relationship between the message server 104 and the user's mobile device 106 allows further functionality to be performed by the client computer 102 and the user's mobile device 106. In such embodiments, the mobile device may transfer other information to the client computer 102. Such information may relate to the devices health (e.g., battery power, network connection, device status, etc.) The client computer 102 may then use the device information to present device specific information to the user via the personal information application. Additionally, the user may be able to control the user's mobile device 106 from client computer 102. For example, the client device 102 may transmit mobile device commands to the mobile device 106 via message server 104. Such device commands may include, but are not limited to, powering the device on/off, connecting/disconnecting the device from a network, instructing the device to make a phone call, etc.

In yet another embodiment, the relationship established between the user's mobile device 106 and message server 104 allows for all messages sent between mobile devices, such as mobile devices 108 and 106 to be stored on message server 104. For example, messages sent directly from user's mobile device 106 may still be stored in a "Sent Items" folder on the message server. This allows for all messages to be accessible by client computer 102 and allows for the completing of message threads across devices (e.g., client computer 102 and user's mobile device 106). Furthermore, storing the messages at the message server 104 allows a user to respond to any message (e.g., mobile device message, email message, etc.) from any of the users devices (e.g., client computer 102 or user's mobile device 106). This seamless transition gives the user the ability to answer messages as the user sees fit by replying with different types of messages and/or replying through the use of different types of devices.

FIGS. 2-6 illustrate methods 200, 300, 400, 500, and 600 according to embodiments. Methods 200, 300, 400, 500, and 600 may be performed in any suitable computing environment. For example, the methods may be executed by systems such as illustrated in FIG. 1. Therefore, the description of operational flows 200, 300, 400, 500, and 600, may refer to at least one of the components of FIG. 1. However, any such reference to components of FIG. 1 is for descriptive purposes only, and it is to be understood that the implementation of FIG. 1 is a non-limiting environment for methods 200, 300, 400, 500, and 600.

Figure 2:
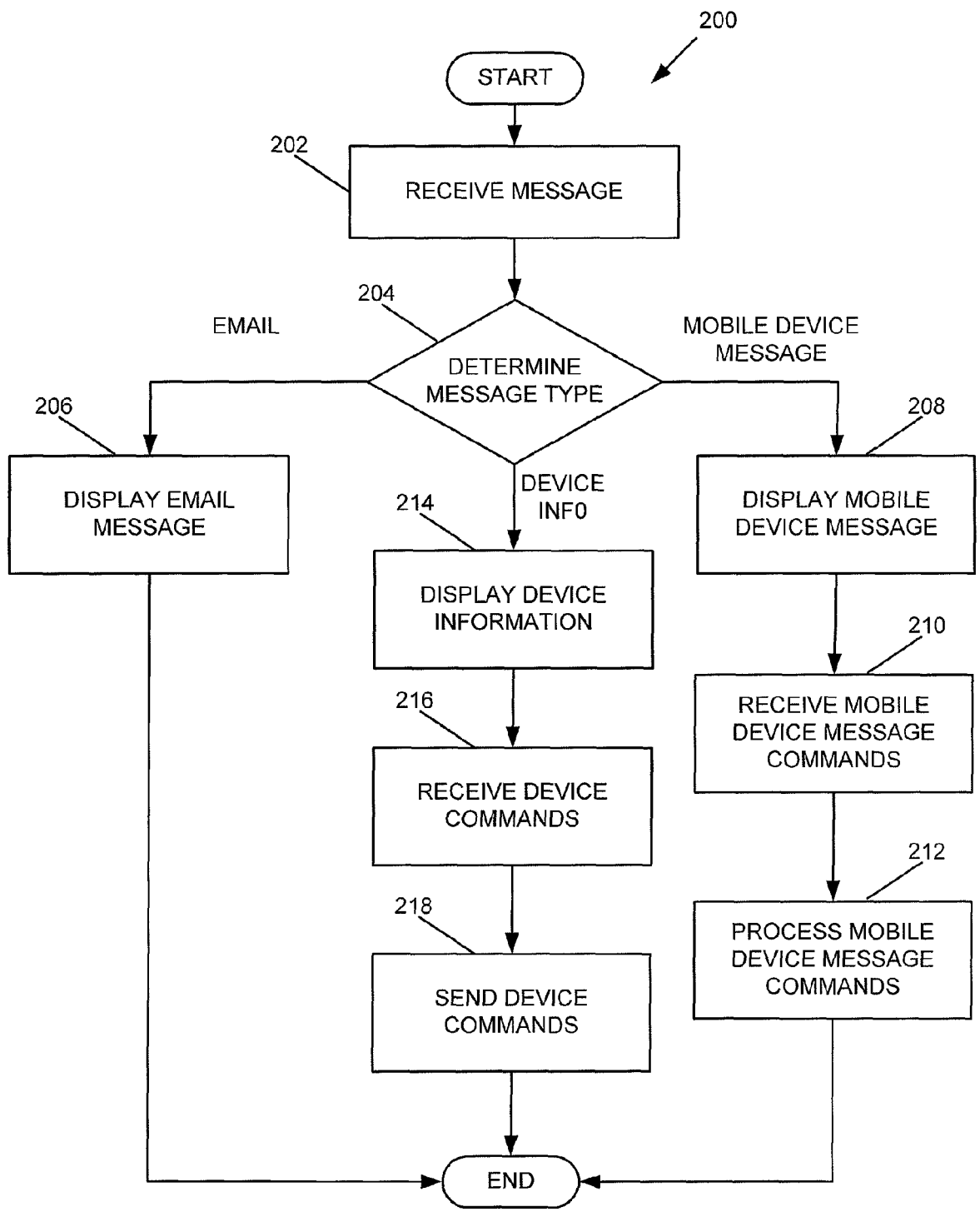
FIG. 2 is a flow chart representing an embodiment of a method 200 for processing messages at a client.

FIG. 2 is a flow chart representing an embodiment of a method 200 for processing messages at a client. In embodiments, a client may be client computer 102 (FIG. 1). In other embodiments, a client may be any type of device other than a mobile device. In yet another embodiment, the client may be an application executing on a device operable to receive and process messages (e.g., a personal information application). Flow begins at operation 202, where the client receives a message. In embodiments, the client receives a message from a message server such as message server 104 (FIG. 1). Flow proceeds to operation 204 where the client determines the type of the message. In embodiments, the client is operable to receive many types of messages including, but not limited to, email messages, mobile device messages, command messages, information messages, or any other type of message known in the art. In embodiments, the client analyzes the message to determine the message type. The client may analyze the data structure of the message to determine the message type. In other embodiments, the client analyzes the content of the message to determine the data type. In further embodiments, the client analyzes other characteristics to determine the message type. Message characteristics may include indicators describing a message type such as headers, a flag, statements within the message defining the message type, message format, etc. In still another embodiment, the message contains an attachment identifying the message type. One of skill in the art will appreciate that in the described embodiments, any type of message analysis known in the art may be used by the client to determine the message type.

If the client determines that the message is an email message, flow branches EMAIL to operation 206. At operation 206, the client displays the email message to a user. In one embodiment, the client may display the message to the client via a personal information application. In another embodiment, the client may display the email message to the client via a browser accessing a web-based message repository. In further embodiments, the client may allow the user to perform operations on the email message.

If the client determines at operation 204 that the message is a mobile device message, flow branches MOBILE DEVICE MESSAGE to operation 208. In embodiments, the client may identify the message as a mobile device message based upon the type of the data structure containing the message. For example, the message may be of a type specifically associated with mobile device messages. In an embodiment, the association is established by defining a new class of message for the mobile device messages. For example, if XML is being used to transmit the message, mobile device messages may be identified by a defining a mobile device message class within the XML message. In other embodiments, the determination at operation 204 can be based upon other indicators that are part of the message or sent with the message. Such indicators may include, but are not limited to, specifically defined flags, classes, byte structure, etc. The client may analyze such indicators in order to determine the type of the message.

At operation 208, the client may display the mobile device message to the user. In embodiments, the client displays the mobile device message to the user in such a way that the user can distinguish the mobile device message from other messages. For example, the client may display the mobile device message with a text indicator such as "SMS" or "MMS" to inform the client that the message is a mobile device message. In another embodiment, the client displays the mobile device message using an icon to identify the message as a mobile device message. For example, the message is displayed in a list of messages with an icon specific to mobile device messages (e.g., the icon differs from icons representing an email message).

Flow proceeds to operation 210 where the client receives mobile device message commands from the user. In such embodiments, a relationship as described with respect to FIG. 1 may be established between a message server such as message server 104 (FIG. 1) and a mobile device such as user's mobile device 106 (FIG. 1) that allow the client to receive mobile device messages. In one embodiment, the client displays a graphical user interface ("GUI") that allows the user to input mobile device commands. Using the GUI, the user is able to perform operations such as replying to the mobile device message, forwarding the mobile device message, sorting the mobile device message, searching the mobile device message, and/or deleting the mobile device message. In further embodiments, the GUI provides the user the option to create and send new mobile device messages.

In yet another embodiment, the client may receive mobile device message commands from a user who is operating upon a different type of message. For example, in an embodiment, the user desires to respond to an email message with a mobile device message. The user would select the appropriate command from the GUI to respond with a mobile device message and the user is provided with a text box in which she can enter her response. The response is then transmitted as a mobile device message and delivered to the recipient's mobile device via the relationship established between the user's mobile device and the message server. This gives the user the opportunity to respond to different types of messages in different manners. As illustrated, a user can respond to an email message with a mobile device message. In other embodiments, the user may respond to a mobile device message with an email message. In further embodiments, the user is capable to responding to any type of message (e.g., email, mobile device messages, voicemail, faxes, etc.) with any other type of message (e.g., email, mobile device messages, voicemail, faxes, etc.).

Flow proceeds to operation 212, where the client processes the mobile device commands it receives. The action performed by the client at step 212 may be dependent upon the mobile device command received at operation 210. For example, in one embodiment if the client receives a command to reply, forward, or create a new mobile device message, the client displays a GUI which allows a user to perform the desired command. For example, the client may provide a text box in which the user can enter the content of a mobile device message and/or a GUI interface to receive additional commands such as sending the message. In another embodiment, if the client receives the command to send the mobile device message, the client transmits the mobile device message to a message server at operation 212. In further embodiments, the client performs a data type transformation and or compression of the mobile device message before transmitting the message to a message server. For example, the mobile device message may have to be in a specific format or compression before it can be transmitted to the user's mobile device and/or the intended recipient. In embodiments, the client optionally performs such format and/or compression operations upon the mobile device message at operation 212. In other embodiments, such operations are performed at a later time by a message server or the user's mobile device.

If the client determines at operation 214 that the message contains mobile device information, flow branches DEVICE INFO to operation 214. In embodiments, the mobile device information contains information related to the health and or status of the user's mobile device. At operation 214, the client may display the mobile device information to the user via a GUI interface. In embodiments, the GUI interface is a part of the personal information application. In another embodiment, the GUI interface is a part of a separate application. In embodiments, the mobile device information takes the form of indicators that are sent from the user's mobile device to the client computer. The indicators may take the form of predefined flag values transmitted to the client via a data structure, command messages instructing the client to perform a certain action (e.g., a command message instructing the client to display a certain value corresponding to the battery level of the mobile device on the client's user interface), or a message containing information related to the device which the client parses to determine the device information.

Flow proceeds to operation 216 where the client receives device commands from the user. In embodiments, the device commands are received via the GUI interface displaying the mobile devices health/status information. Such device commands may include, but are not limited to, powering the device on/off, connecting/disconnecting the device from a network, instructing the device to make a phone call, etc. One of skill in the art will appreciate that other device commands can be readily practiced with the embodiments disclosed herein. Upon receiving the device commands, flow proceeds to operation 218, where the client sends the device commands to a message server, such as message server 104 (FIG. 1), in order to transmit the device commands to the user's mobile device.

Figure 3:
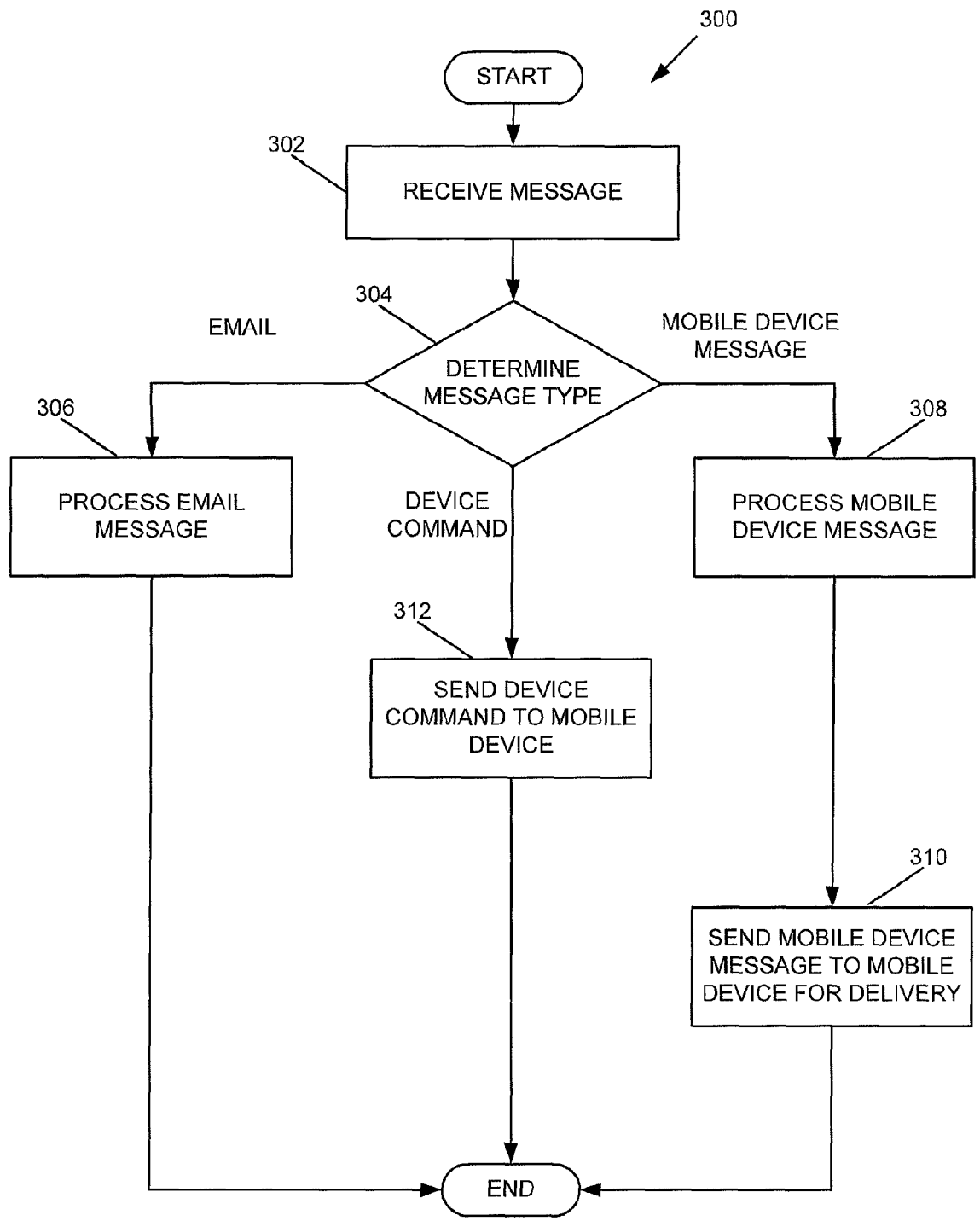
FIG. 3 is a flow chart representing an embodiment of a method 300 performed by a message server for processing messages receive from a client.

FIG. 3 is a flow chart representing an embodiment of a method 300 performed by a message server for processing messages receive from a client. Flow begins at operation 302, where a message server receives a message. In embodiments a message server, such as message server 104 (FIG. 1), receives a message from a client, such as client computer 102 (FIG. 1). Flow proceeds to operation 304 where the message server determines the type of the message. In embodiments, the message server may be operable to receive many types of messages including, but not limited to, email messages, mobile device messages, command messages, information messages, or any other type of message known to the art. In embodiments, the message server analyzes the message to determine the message type. The message server may analyze the data structure of the message to determine the message type. In other embodiments, the message server analyzes the content of the message to determine the data type. In further embodiments, the message analyzes other characteristics to determine the message type. One of skill in the art will appreciate that in the described embodiments, any type of message analysis known to the art may be used by the message server to determine the message type.

If the message server determines that the message is an email message, flow branches EMAIL to operation 306. At operation 306, the message server processes the email message. In one embodiment, the message server stores the email message in an outgoing mailbox. In another embodiment, the message server may forward the email message to the intended recipient. In further embodiments, the message server processes the email message in any other way known in the art.

If the message server determines at operation 304 that the message is an out bound mobile device message, flow branches MOBILE DEVICE MESSAGE to operation 308. In embodiments, the determination may be based upon message type and/or message indicators as previously described with respect to operation 208 (FIG. 2). At operation 308, the message server processes the mobile device message. In embodiments, the message server performs a data type transformation and or compression of the mobile device message before transmitting the message to a user's mobile device to transform the mobile device message into a proper format for the user's mobile device. For example, the user's mobile device message may have to be in a specific format or compressed before it can be transmitted to the user's mobile device and/or intended recipient. In embodiments, the message server may optionally perform such format and/or compression operations upon the mobile device message at operation 308.

In a further embodiment, the message server may determine which mobile device to send the out bound message to at operation 308. For example, if a user establishes relationships with multiple mobile devices and the message server, the user may desire to send a mobile device message from a specific mobile device. In such situations, the message server must determine which mobile device to forward the mobile device message to for delivery. In one embodiment, the message server may examine a "FROM" field indicated by the mobile device message to determine which device the user intends on sending the message from. In such an embodiment, the message server forwards the message to the mobile device with a phone number that matches the phone number listed in the "FROM" field. In other embodiments, the server may receive instructions and/or indications from the client along with the mobile device message. In such embodiments the indications may be similar to the types of indications previously discussed with respect to operation 214 (FIG. 2).

In yet another embodiment, the message server may truncate the mobile device messages at operation 308. Generally, the sizes of mobile device messages are limited due to constraints in the memory available on the mobile device and/or constraints put in place by the mobile device's network. For example, SMS messages are limited to a predefined set of characters. In some networks, SMS messages are limited to 160 characters. In such situations, the message server truncates SMS messages received by the client in order to meet the size requirements. In embodiments, the message server may break the SMS message received from the client into multiple SMS messages that meet the size requirement. These multiple SMS messages may then be sent to the mobile device for transmission to the intended recipient. In other embodiments, such operations may be performed at a different time by a client or the user's mobile device.

In embodiments where the message server performs operations upon the mobile device message, the message server may receive instructions related to the operations. For example, the message server may receive instructions related on whether or not to perform the operation, parameter values associated with the operation (e.g., message size limits for truncation purposes), when to perform the operation, etc. In one embodiment, the instructions are similar to the indications discussed with respect to operation 214 (FIG. 2). In other embodiments, the instructions may be transmitted to the message server in a message. Table 2 provides an example instruction message detailing truncation instructions for a message server.

TABLE 2

Example Instruction Message

<?xml version="1.0" encoding="utf-8"?>
<Sync xmlns="AirSync:" xmlns:A="AirSyncBase:" xmlns:B=
"POOMMAIL:" xmlns:C="POOMTASKS:">>
  <Collections>
    <Collection>
      <SyncKey>601771687</SyncKey>
      <CollectionId>15</CollectionId>
      <DeletesAsMoves/>
      <GetChanges/>
      <WindowSize>100</WindowSize>
      <Options>
        <Class>SMS</Class>
        <FilterType>0</FilterType>
        <A:BodyPreference>
          <A:Type>1</A:Type>
          <A:TruncationSize>102400</A:TruncationSize>
        </A:BodyPreference>
      </Options>
      <Options>
        <FilterType>2</FilterType>
        <A:BodyPreference><A:Type>1</A:Type></A:BodyPreference>
        <A:BodyPreference><A:Type>2</A:Type></A:BodyPreference>
        <A:BodyPreference><A:Type>4</A:Type><A:TruncationSize>102400</A:TruncationSize></A:BodyPreference>
        <MIMESupport>0</MIMESupport>
        <Conflict>1</Conflict>
      </Options>
      <Commands>

Although Table 2 illustrates and example XML message, one of skill in the art will appreciate that any message format and/or language may be practiced with embodiments of the disclosure. Additionally, the message server may receive such instruction messages from both the client and the user's mobile device.

After processing the mobile device message, flow proceeds to operation 310 and the message server transmits the mobile device message to the user's mobile device. Unlike other messages, the message server cannot deliver the mobile device message to the intended recipient. For example, the mobile device network of the recipient device may not be directly accessible to the client or the message server. This is due to the limitations previously mentioned regarding establishing billing agreements, third party contracts, etc. However, due to the relationship established between the message server and the user's mobile device (as discussed with respect to FIG. 1) the message server can leverage the user's mobile device to transmit the mobile device message to the intended recipient. Thus, at operation 310 the message server transmits the mobile device message to the user's mobile device for delivery to the intended recipient.

In another embodiment, the message server is not be able to transmit the mobile device message to the user's mobile device. For example, the mobile device's battery may be dead, the mobile device may be off, or there may be problems with mobile network. In such instances, the message server may send a non-delivery receipt ("NDR") to the client to inform the client of the message server's failure to transmit the mobile device message. In another embodiment, after returning the NDR to the client, the message server attempts to resend the mobile device message to the mobile device when the mobile device becomes available. Upon successfully resending the mobile device message, the message server may send a delivery confirmation receipt to the client.

If the message server determines that the message is a mobile device command at operation 304, flow branches DEVICE COMMAND to operation 312. At operation 312, the message server transmits the mobile device command to the user's mobile device. In embodiments, the message server may process the mobile device command before sending it to the mobile device (e.g., the message server may perform format transformation, compression etc.)

Figure 4:
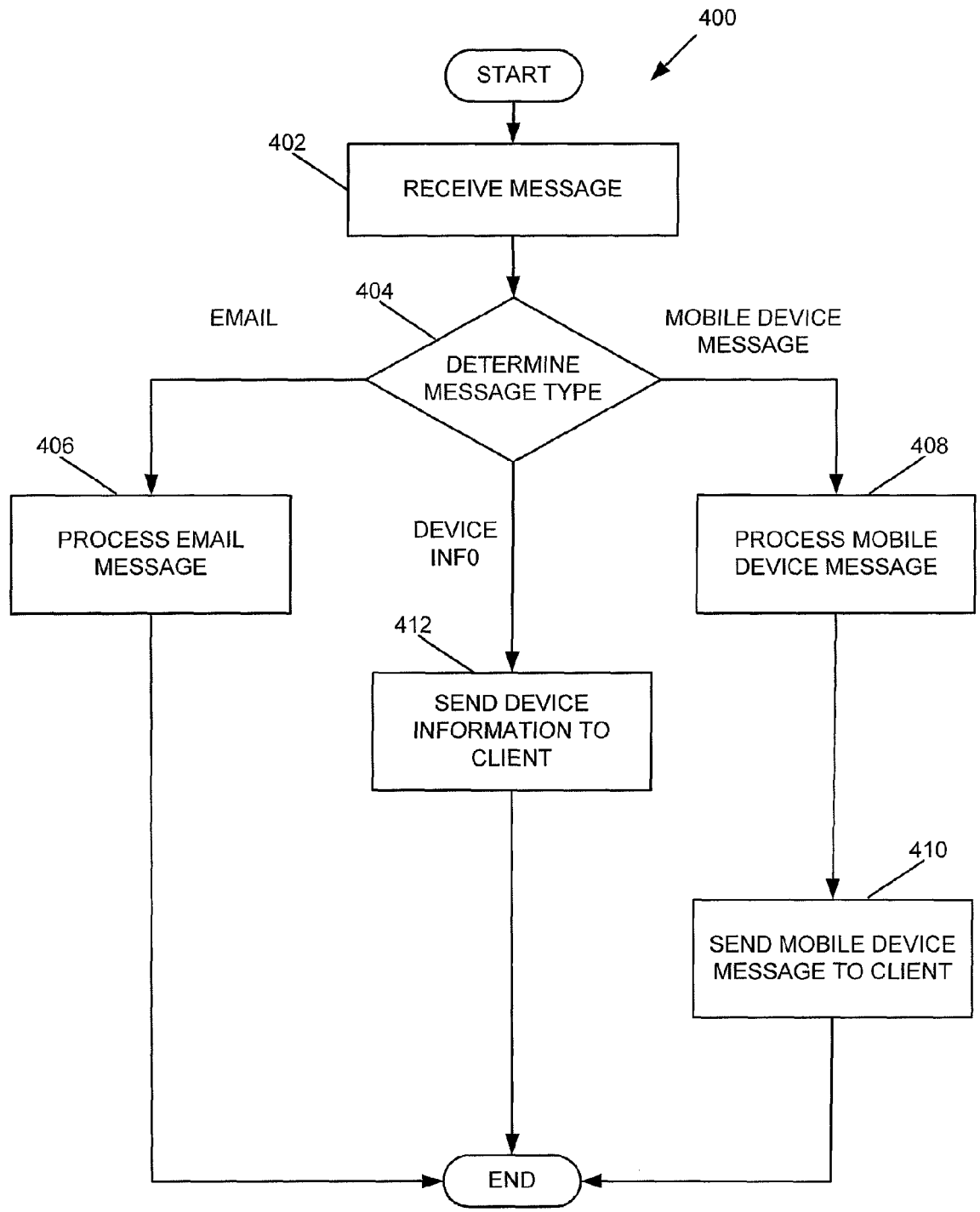
FIG. 4 is a flow chart representing an embodiment of a method 400 performed by a message server for processing messages received from a mobile device.

FIG. 4 is a flow chart representing an embodiment of a method 400 performed by a message server for processing inbound messages received from a mobile device. Flow begins at operation 402, where a message server receives a message. In embodiments a message server, such as message server 104 (FIG. 1), receives a message from a user's mobile device, such as user's mobile device 106 (FIG. 1).

Flow proceeds to operation 404 where the message server determines the type of message received. In embodiments, the message server is operable to receive many types of messages including, but not limited to, email messages, mobile device messages, command messages, information messages, or any other type of message known to the art. In embodiments, the message server analyzes the message to determine the message type as explained above with respect to operation 304 (FIG. 3).

If the message server determines that the message is an email message, flow branches EMAIL to operation 406. At operation 406, the message server processes the email message. In one embodiment, the message server may store the email message in a user's inbox folder. In another embodiment, the message server may forward the email message to the user's computer, such as computer device 102 (FIG. 1). In further embodiments, the message server processes the email message in any other way known to the art.

If the message server determines that the message is a mobile device message, flow branches MOBILE DEVICE MESSAGE to operation 408. In embodiments, the determination may be based upon message type and/or message indicators as previously described with respect to operation 208 (FIG. 2). At operation 408, the message server processes the mobile device message. In embodiments, the message server may perform a data type transformation and or compression/decompression of the mobile device message before transmitting the message to a client. For example, the user's mobile device message may have to be in a specific format or compressed before it can be transmitted and processed by the client. In embodiments, the message server may optionally perform such format and/or compression operations upon the mobile device message at operation 408. In other embodiments, such operations may be performed at a different time by a client or the user's mobile device.

In yet another embodiment, the message server may concatenate multiple mobile device messages together. Generally, mobile device networks limit the size of mobile device messages. For example, SMS messages are limited to 160 characters by some mobile networks. If a SMS message is larger than 160 messages, in such networks, the SMS message is generally broken into portions and transmitted as separate messages. In such instances, the message server may recognize that the separate messages comprise a single mobile device message and concatenate the SMS messages and construct a single SMS message that may be sent to the client. Because the client can support message sizes larger than 160 characters, the reconstruction of a single mobile device message that has been divided due to size limitations allows a user to view a mobile device message in its entirety on the client. After processing the mobile device message, flow proceeds to operation 410 and the message server transmits the mobile device message to the client.

If the message server determines that the message contains mobile device information, flow branches DEVICE INFO to operation 412. In embodiments, the server may forward the device information to a client at operation. In other embodiments, the server may process and store the device information at operation 412.

Figure 5:
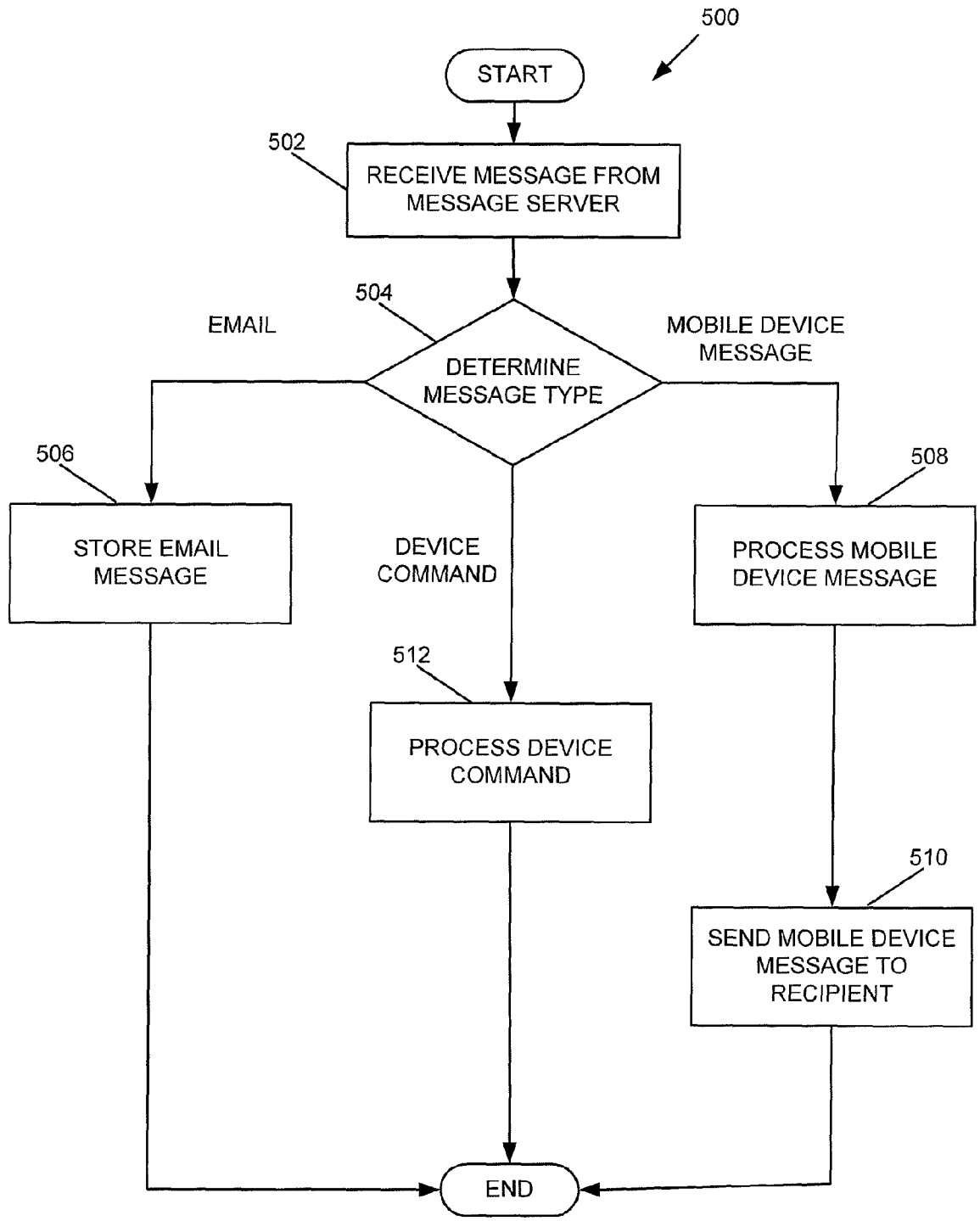
FIG. 5 is a flow chart representing an embodiment of a method 500 performed by a mobile device for processing messages received from a message server.

FIG. 5 is a flow chart representing an embodiment of a method 500 performed by a mobile device for processing messages received from a message server. Flow begins at operation 502, where a mobile device, such as user's mobile device 106 (FIG. 1), receives a message from a message server. As described with respect to FIG. 1, the mobile device is capable of receiving the messages from the message server due to the establishment of a relationship between the message server and the mobile device. In one non-limiting embodiment, an Exchange ActiveSync® relationship may facilitate the transmission of messages between the mobile device and the message server. In other embodiments, other type of protocols and/or relationships may be used to establish a relationship between the mobile device and the message server.

Flow proceeds to operation 504 where the mobile device determines the type of the message. In embodiments, the mobile device may be operable to receive many types of messages including, but not limited to, email messages, mobile device messages, command messages, information messages, or any other type of message known to the art. In embodiments, the mobile device analyzes the message as explained above with respect to operation 304 (FIG. 3).

If the mobile device determines that the message is an email message, flow branches EMAIL to operation 506. At operation 506, the mobile device stores the email message in the devices local memory. The email message may then be retrieved later for display to the user. In one embodiment, the mobile device may provide an interface, such as a GUI, that allows the user to display, operate upon, respond to, delete, and/or forward the email message. In further embodiments, the mobile device processes the email message in any other way known to the art.

If the mobile device determines that the message is a mobile device message, flow branches MOBILE DEVICE MESSAGE to operation 508. In embodiments, the determination may be based upon message type and/or message indicators as previously described with respect to operation 208 (FIG. 2). At operation 508, the mobile device processes the mobile device message. In embodiments, the mobile device may perform a data type transformation and or compression/decompression of the mobile device message before transmitting the message to a recipient device via the mobile device network, such as network 114 (FIG. 1). For example, the user's mobile device message may have to be in a specific format or compressed before it can be transmitted by the mobile device over the mobile device's network. In embodiments, the mobile device may optionally perform such format and/or compression operations upon the mobile device message at operation 508. In other embodiments, such operations may be performed at a different time by a client or a message server. After processing the mobile device message, flow proceeds to operation 510 and the mobile device transmits the mobile device message to the recipient mobile device via the mobile device network.

In another embodiment, if the mobile device is unable to transmit the mobile device message to the recipient mobile device the user's mobile device may send an NDR to the message server. In such embodiments, the message server relays the NDR to the client to inform the client that the mobile device failed to deliver the mobile device message. In a further embodiment, the mobile device may continue to attempt to send the mobile device message to the recipient mobile device. Upon successfully delivering the mobile device message to the recipient mobile device, the user's mobile device may return a delivery acknowledgment receipt to the message server. Again, the message server may relay this delivery acknowledgment receipt to the client device.

If the mobile device determines that the message is a mobile device message, flow branches DEVICE COMMAND to operation 512. At operation 512, the mobile device receives the mobile device command and processes the instructions found within the command. The mobile device may then perform the received command. In embodiments, the received commands are the commands discussed previously with respect to FIG. 1.

Figure 6:
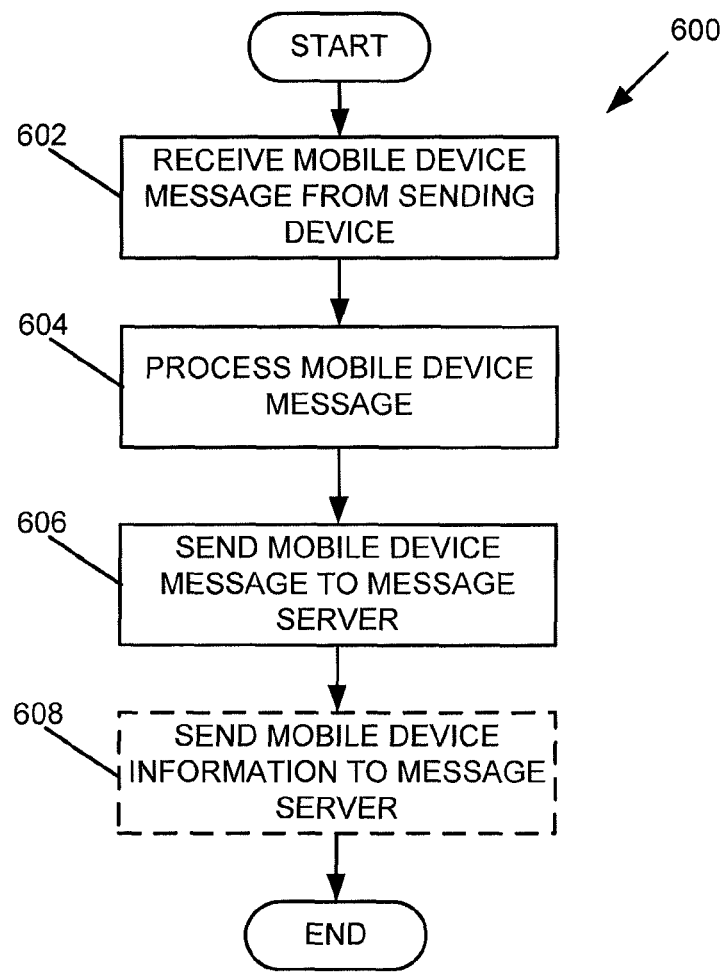
FIG. 6 is a flow chart representing an embodiment of a method 600 performed by a mobile device for processing messages received from a sending device.

FIG. 6 is a flow chart representing an embodiment of a method 600 performed by a mobile device for processing messages received from a sending device. Flow begins at operation 602 where a mobile device, for example user's mobile device 106 (FIG. 1), receives a mobile device message from a sending mobile device, for example mobile device 108 (FIG. 1). In embodiments, the recipient mobile device may have a relationship established with a message server, as discussed with respect to FIG. 1. Flow proceeds to operation 604, where the user's mobile device processes the mobile device message. In an embodiment, the user's mobile device saves the mobile device message to device's local storage at operation 604. In another embodiment, the mobile device may perform a data type transformation and or compression/decompression of the mobile device message before transmitting the message to message server. For example, the user's mobile device message may have to be in a specific format or compressed before it can be transmitted by the mobile device to the message server. In embodiments, the mobile device may optionally perform such format and/or compression operations upon the mobile device message at operation 604.

Flow proceeds to operation 606, where the user's mobile device sends the mobile device message to the server. After sending the mobile device message to the message server, flow may optionally proceed to operation 608, where the user's mobile device gathers device information related to the health and/or status of the mobile device (e.g., battery power, network connection, device status, etc.) The health and/or status information may then be transmitted to the message server to be delivered to the client. In another embodiment, the user's mobile device may gather health and/or status information in response to polling from the message server.

Figure 7:
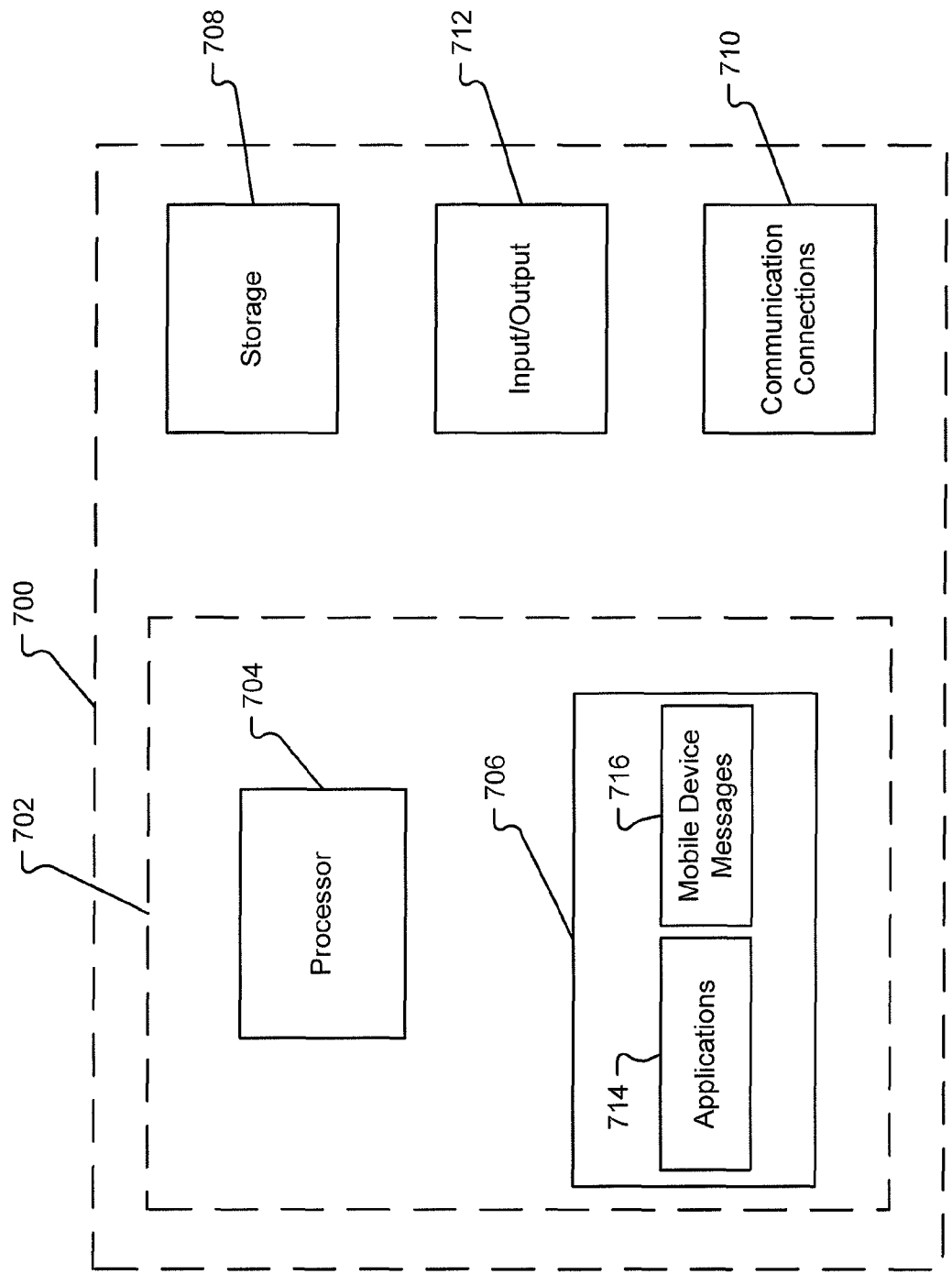
FIG. 7 is a functional diagram illustrating a computer environment and computer system 700 operable to execute embodiments of the present disclosure.

With reference to FIG. 7, an embodiment of a computing environment for implementing the various embodiments described herein includes a computer system, such as computer system 700. Any and all components of the described embodiments may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 700 comprises at least one processing unit or processor 704 and system memory 706. The most basic configuration of the computer system 700 is illustrated in FIG. 7 by dashed line 702. In some embodiments, one or more components of the described system are loaded into system memory 706 and executed by the processing unit 704 from system memory 706. Depending on the exact configuration and type of computer system 700, system memory 706 may be volatile (such as RAM), non-volatile (such as ROM, flash memory, etc.), or some combination of the two.

Additionally, computer system 700 may also have additional features/functionality. For example, computer system 700 includes additional storage media 708, such as removable and/or non-removable storage, including, but not limited to, magnetic or optical disks or tape. In some embodiments, software or executable code and any data used for the described system is permanently stored in storage media 708. Storage media 708 includes volatile and non-volatile, removable and non-removable media implemented in any method or technology for storage of information such as computer readable instructions, data structures, program modules, or other data. In embodiments, the capability negotiation methods and wrapper inner methods are stored in storage media 708.

System memory 706 and storage media 708 are examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage, other magnetic storage devices, or any other medium which is used to store the desired information and which is accessed by computer system 700 and processor 704. Any such computer storage media may be part of computer system 700. In some embodiments, mobile device messages are stored in system memory 706. In embodiments, system memory 706 and/or storage media 708 stores data used to perform the methods or form the system(s) disclosed herein, such as generating well-defined messages, expressing a collective intent of security semantics, accepting and/or rejecting well-defined messages, etc. In embodiments, system memory 706 would store information and or processes such as Application 714 and mobile device messages 716. In embodiments, Application 714 are personal information application, web browsers, or other applications related to sending and receiving messages. Mobile device messages 716, in embodiments, are stored representations of mobile device messages. In other embodiments, mobile device messages 716 are other types of messages that may be transmitted between a client and a mobile device.

Computer system 700 may also contain communications connection(s) 710 that allow the device to communicate with other devices. In embodiments, communications connection (s) 710 may be used to transmit and receive messages between sender devices, intermediary devices, and recipient devices. Communication connection(s) 710 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, mobile device messages may be transmitted over the communication connection(s) 710.

In some embodiments, computer system 700 also includes input and output connections 712, and interfaces and peripheral devices, such as a graphical user interface. Input device (s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 712 are used to display the information as described herein. All these devices are well known in the art and need not be discussed at length here.

In some embodiments, the component described herein comprise such modules or instructions executable by computer system 700 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 700 is part of a network that stores data in remote storage media for use by the computer system 700.

This disclosure described some embodiments of the present disclosure with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present disclosure. Therefore, the specific structure, acts, or media are disclosed only as illustrative embodiments. The disclosure is defined by the appended claims.

What is claimed is:

1. A message server comprising:
   at least one processor; and
   memory encoding computer executable instructions that, when executed by the at least one processor, perform a method comprising:
      establishing a relationship with a mobile device, wherein the relationship is established by receiving a message from the mobile device, wherein the message comprises information about the mobile device and an indication that the mobile device can send mobile device messages on behalf of the message server, and wherein upon establishing the relationship the message server can send mobile device messages via the mobile device;
      receiving, at the message server, a first message from a client; and
      when the first message is a mobile device message, sending the first message to the mobile device for transmitting to a recipient mobile device.

2. The message server of claim 1, wherein the method further comprises processing the mobile device message.

3. The message server of claim 2, wherein the mobile device message is one of a SMS message, an EMS message, and an MMS message.

4. The message server of claim 3, wherein the processing of the mobile device message further comprises:
   determining whether the mobile device message is larger than a predefined set of characters;
   truncating the mobile device message into one or more truncated mobile device messages when the SMS message is larger than 160 characters; and
   sending the one or more truncated mobile device messages to the mobile device for transmitting to the recipient mobile device.

5. The message server of claim 1, wherein the method further comprises generating a non-delivery receipt when the server is unable to deliver the mobile device message to the mobile device.

6. The message server of claim 1, wherein the method further comprises receiving a non-delivery receipt when the mobile device is unable to deliver the mobile device message to the recipient mobile device.

7. The message server of claim 1, wherein the method further comprises:
   receiving a second message from the mobile device;
   determining the type of the second message; and
   delivering the second message to the client.

8. The message server of claim 7, wherein the second message comprises two or more separate mobile device messages.

9. The message server of claim 8, wherein the method further comprises:
   determining, by the message server, that the two or more separate mobile device messages are portions of a single mobile device message; and
   concatenating the two or more separate mobile device messages into the single mobile device message.

10. The message server of claim 1, wherein the method further comprises processing the first message, wherein the processing comprises transforming the first message into a proper format for the user's mobile device.

11. The message server of claim 10, wherein the method further comprises compressing the first message.

12. A storage device encoding computer executable instructions for performing a method of transmitting a mobile device message, the method comprising:
   receiving, at a first mobile device, a first message from a message server, wherein a relationship exists between the first mobile device and the message server, and wherein the relationship is established by sending a message, from the first mobile device to the message server, comprising information about the first mobile device and an indication that the first mobile device can send mobile device messages on behalf of the message server;
   determining the type of the first message; and
   when the first message is a mobile device message, transmitting, by the first mobile device, the mobile device message to a second mobile device.

13. The storage device of claim 12, wherein when the first message is a mobile device command message, the first mobile device executes the mobile device command.

14. The storage device of claim 12, further comprising instructions for processing the mobile device message.

15. The storage device of claim 14, wherein processing the mobile device message comprises transforming the mobile device message into a format compatible for transit over a mobile device carrier network supporting the first mobile device.

16. The storage device of claim 12, further comprising instructions for:
   receiving a second message from a third mobile device;
   determining the type of the second message; and
   when the second message is a second mobile device message, sending the second mobile device message to a client via the message server.

17. The storage device of claim 12, further comprising instructions for sending the health data of the first mobile device to the message server for later transmitting to a client.

18. A storage device encoding computer executable instructions that, when executed by at least one processor, perform a method comprising:
   establishing a relationship between a message server and a first mobile device, wherein the relationship is established by receiving, at the message server, a message from the first mobile device, wherein the message comprises information about the first mobile device and an indication that the first mobile device can send mobile device messages on behalf of the message server, wherein upon establishing the relationship the message server can send mobile device messages via the first mobile device;
   receiving, at the message server, a first message from a client; and
   when the first message is a mobile device message, sending the first message from the message server to the first mobile device for transmitting to a second mobile device.

19. The storage device of claim 18, wherein the method further comprises:
   receiving, at the message server, a second message from the first mobile device;
   determining the type of the second message; and
   when the message is a device command, delivering the second message to the client.

20. The storage device of claim 18, wherein the method further comprises:
   determining whether the first mobile device message is larger than predefined set of characters;
   truncating the first mobile device message into one or more truncated mobile device messages when the SMS message is larger than 160 characters; and
   sending the multiple mobile device messages to the first mobile device for transmitting to the second mobile device.

* * * * *